(No Model.)
J. BOND, Jr.
Clutching and Releasing Device for Shafts.
No. 238,838.   Patented March 15. 1881.
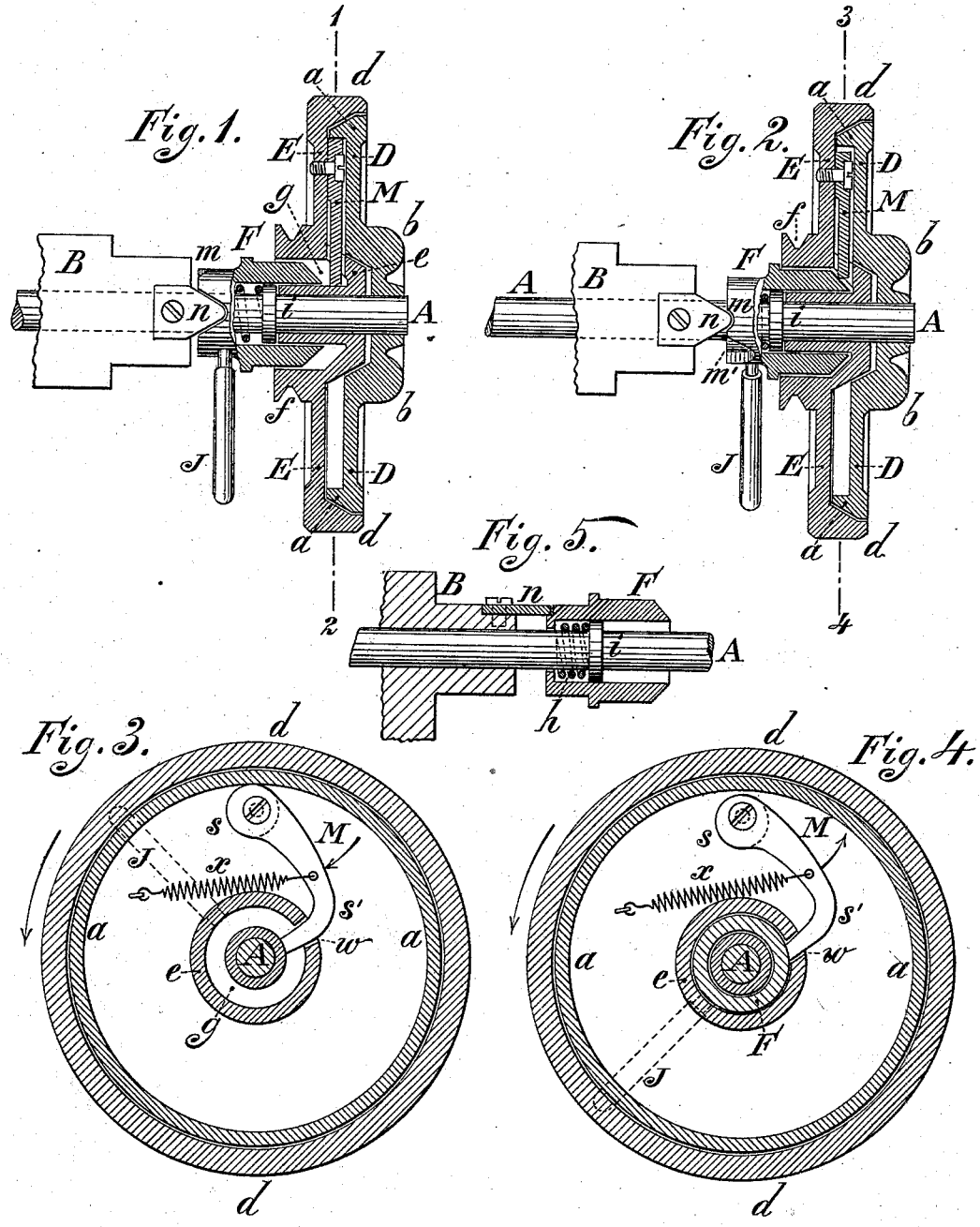
Witnesses:
Robert H. Hox
Harry Smith
Inventor:
Joseph Bond, Jr.
by his Attorneys
Howson & Son

UNITED STATES PATENT OFFICE.

JOSEPH BOND, JR., OF PHILADELPHIA, PENNSYLVANIA, ASSIGNOR OF ONE-HALF TO CHARLES M. SWAIN, OF SAME PLACE.

CLUTCHING AND RELEASING DEVICE FOR SHAFTS.

SPECIFICATION forming part of Letters Patent No. 238,838, dated March 15, 1881.

Application filed July 2, 1880. (No model.)

*To all whom it may concern:*

Be it known that I, JOSEPH BOND, Jr., a citizen of the United States, residing in Philadelphia, Pennsylvania, have invented certain Improvements in Clutching and Releasing Devices for Shafts, of which the following is a specification.

The objects of my invention are to readily and securely clutch a pulley to a shaft, to release the pulley therefrom with equal readiness, and to provide for the turning of the shaft in either direction when the pulley is released therefrom. These objects I attain in the manner too fully described hereinafter to be dwelt upon at length in this part of the specification.

In the accompanying drawings, Figure 1 is a longitudinal section, partly in elevation, of my improved device as it appears when the pulley is clutched to the shaft; Fig. 2, the same, showing the pulley released from the shaft; Fig. 3, a transverse section on the line 1 2, Fig. 1; Fig. 4, a transverse section on the line 3 4, Fig. 2; and Fig. 5, a detached section of part of Fig. 2.

A is a shaft, which turns in and projects from a suitable bearing, B, the latter forming part of the frame of any machine of which the shaft is a part.

To the outer end of the shaft is secured a wheel or disk, D, which has at the edge an internal flange, $a$, the outer face of the disk having a rounded annular rib, $b$, forming a hand-wheel, by means of which the disk, with the shaft, may be turned in either direction.

E is a pulley loose on the shaft A, the flange $d$ of this pulley overlapping the flange of the disk D, and the hub $e$ of the pulley having an external groove, $f$, for the reception of the driving-belt, and an internal annular recess, $g$, for the reception of a sleeve, F, between an internal shoulder at the outer end of which and a collar, $i$, on the shaft A intervenes a coiled spring, $h$, the tendency of which is to move the sleeve outward. The inner end of the sleeve is tapered or conical, and in the outer end of the sleeve are formed two recesses, $m$ and $m'$, which are adapted to a V-shaped plate, $n$, bolted to and projecting from the bearing B, the recess $m$ being shallow and segmental, so as to receive the rounded nose only of the plate $n$, but the recess $m'$ being V-shaped, and of such a depth as to receive almost the entire projecting portion of said plate. The sleeve F is free to turn on the shaft A, and has a projecting arm, J, by means of which a movement of rotation, or partial rotation, may be readily imparted to it.

Hung to the inner face of the pulley E is a lever, M, the short arm $s$ of which has a rounded eccentric face, the long arm $s'$ of the lever having a bent end, which projects, through an opening, $w$, in the hub of the pulley, into the annular recess $g$ of said hub, a spring, $x$, acting on the lever M and tending to draw the bent end of the same into said recess.

The operation of the device is as follows: When the parts are in the position shown in Figs. 1 and 3, the pulley E is clutched to the fixed disk D on the shaft by means of the lever M, the eccentric face of the arm $s$ of the latter being in contact with the internal flange, $a$, of the disk, and the bent end of the arm $s'$ of the lever occupying a position in the recess $g$ of the hub $e$, the sleeve F being retracted and the plate $n$ occupying a position in the deep slot $m'$ of said sleeve. As the pulley E rotates in the direction of the arrow, Fig. 3, the friction between the flange $a$ and the eccentric face of the short arm of the lever M tends to aid the spring $x$ in moving said lever in the direction of the arrow 1, Fig. 3, and thereby tightening the gripe on the flange, so that the secure clutching of the disk D to the pulley E is insured.

When it is desired to release the disk D and shaft A from the pulley E, the sleeve F is turned, by means of its arm J, to the position shown in Fig. 2, the V-shaped plate $n$ acting as a cam and causing a simultaneous longitudinal movement of the sleeve, so that the conical inner end of the latter acts upon the bent end of the arm $s'$ of the lever and thrusts the same outward in the direction of the arrow 2, thereby withdrawing the eccentric face of the short arm $s$ of the lever from contact with the flange $a$ of the disk D, and thus releasing the pulley E from said disk and from the shaft.

The sleeve F is retained in the position shown in Figs. 2 and 4 by the engagement of the end of the plate n with the recess m, and when it is desired to again clutch the pulley E to the shaft A the sleeve F is turned forward until the plate n occupies the recess m', and the parts are restored to the positions shown in Figs. 1 and 3.

When the pulley E is released from the shaft A the latter can be readily turned in either direction by manipulating the hand-wheel b, forming part of the disk D, this feature being of considerable importance in sewing-machines, where it is desirable, in many cases, to effect certain adjustments of the needle-bar after the driving-pulley has been released from the shaft, which adjustments, in the absence of the hand-wheel b, cannot conveniently be made.

The flange d of the driving-pulley E, when the clutch is applied to a sewing-machine, is employed to drive, by friction, the bobbin-winding spindle, usually adapted to bearings on the table of the machine adjacent to the pulley E.

The hand-wheel may, if desired, be made separate from and secured to the shaft independently of the disk D, although the construction shown and described is preferred on account of its compactness and convenience.

I claim as my invention—

1. The combination of the shaft A, the clutch-disk D, secured thereto, the loose pulley E, having a belt-wheel, f, and peripheral driving-flange d, means for clutching the pulley to the disk, and a hand-wheel, whereby the shaft A may be turned when the disk D is released from the pulley E, as set forth.

2. The combination of the shaft A, the driving-pulley E, loose thereon, the disk D, secured to the shaft and having a flange, a, the lever M, hung to the pulley E and having a short arm, s, with eccentric face, and means for operating said lever, all substantially as set forth.

3. The combination of the shaft A, the driving-pulley E, loose thereon and having a hub, e, with annular recess g, the disk D, secured to the shaft and having a flange, a, the lever M, hung to the wheel E, and having a short arm, s, with eccentric face, and long arm, s', with bent end, the spring x, the sleeve F, adapted to the recess g, and having a conical end, and means for reciprocating said sleeve, all substantially as specified.

4. The combination of the clutch-actuating sleeve F, having an arm, J, and a V-shaped recess, m', the frame B, having a V-shaped plate, n, and a spring, h, for maintaining the sleeve in contact with said plate, all substantially as described.

5. The combination of the clutch-actuating sleeve F, having an arm, J, a shallow recess, m, and a deep recess, m', the V-shaped plate n, and the spring h, as specified.

In testimony whereof I have signed my name to this specification in the presence of two subscribing witnesses.

JOSEPH BOND, JR.

Witnesses:
JAMES F. TOBIN,
HARRY SMITH.